United States Patent
Pawar et al.

(10) Patent No.: US 9,838,912 B1
(45) Date of Patent: Dec. 5, 2017

(54) SYSTEMS AND METHODS FOR DETERMINING A CARRIER FOR A WIRELESS DEVICE BASED ON FALLBACK AVAILABILITY

(71) Applicant: Sprint Spectrum LP, Overland Park, KS (US)

(72) Inventors: Hemanth Pawar, Brambelton, VA (US); Shilpa Kowdley, Brambelton, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/517,203

(22) Filed: Oct. 17, 2014

(51) Int. Cl.
*H04W 4/00* (2009.01)
*H04W 36/00* (2009.01)
*H04W 72/04* (2009.01)

(52) U.S. Cl.
CPC ... *H04W 36/0022* (2013.01); *H04W 72/0453* (2013.01)

(58) Field of Classification Search
CPC ......... H04W 36/0022; H04W 72/0453; H04W 36/08; H04W 88/06
See application file for complete search history.

(56) References Cited

U.S. PATENT DOCUMENTS

| | | | |
|---|---|---|---|
| 9,173,084 B1* | 10/2015 | Foskett | H04W 8/04 |
| 2010/0202413 A1* | 8/2010 | Vikberg | H04W 36/0022 370/332 |
| 2011/0080867 A1* | 4/2011 | Mildh | H04W 76/02 370/328 |
| 2012/0064885 A1* | 3/2012 | Ramachandran | H04W 68/12 455/423 |
| 2013/0065589 A1* | 3/2013 | Lee | H04W 36/0022 455/436 |
| 2013/0107863 A1* | 5/2013 | Faccin | H04W 36/0022 370/331 |
| 2013/0210466 A1 | 8/2013 | Arvidsson et al. | |
| 2014/0177592 A1* | 6/2014 | Li | H04W 36/0022 370/331 |
| 2015/0117401 A1* | 4/2015 | Jiang | H04W 36/0022 370/331 |

\* cited by examiner

*Primary Examiner* — Abdelnabi O Musa

(57) ABSTRACT

Systems and methods are described for determining a carrier for a wireless device. Data may be communicated between a wireless device and a wireless communication network over a first carrier. It may be determined whether the wireless communication network provides a fallback protocol for switching the wireless device from the first carrier to a second carrier. The wireless device may be instructed to communicate with the wireless communication network over the second carrier when it is determined that the wireless communication network does not provide the fallback protocol.

19 Claims, 8 Drawing Sheets

SYSTEMS AND METHODS FOR DETERMINING A CARRIER FOR A WIRELESS DEVICE BASED ON FALLBACK AVAILABILITY

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may have certain technical limitations. For example, a portion of the network may lack certain functionality due to a heterogeneous environment. Accordingly, a system that effectively considers and mitigates against technical limitations at portions of the network may be able to provide a high quality service to users of the system.

OVERVIEW

Systems and methods are described for determining a carrier for a wireless device. Data may be communicated between a wireless device and a wireless communication network over a first carrier. It may be determined whether the wireless communication network provides a fallback protocol for switching the wireless device from the first carrier to a second carrier. The wireless device may be instructed to communicate with the wireless communication network over the second carrier when it is determined that the wireless communication network does not provide the fallback protocol.

DETAILED DESCRIPTION

Figure 1:
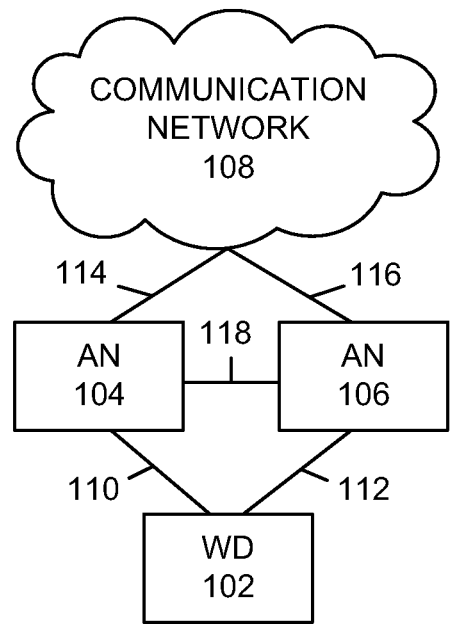
FIG. 1 illustrates an exemplary communication system to determine a carrier for a wireless device.

FIG. 1 illustrates an exemplary communication system 100 to determine a carrier for a wireless device comprising wireless devices 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104 and 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 114 and 116 respectively. Access nodes 104 and 106 may also communicate directly with each other over communication link 118.

Although only access nodes 104 and 106 are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
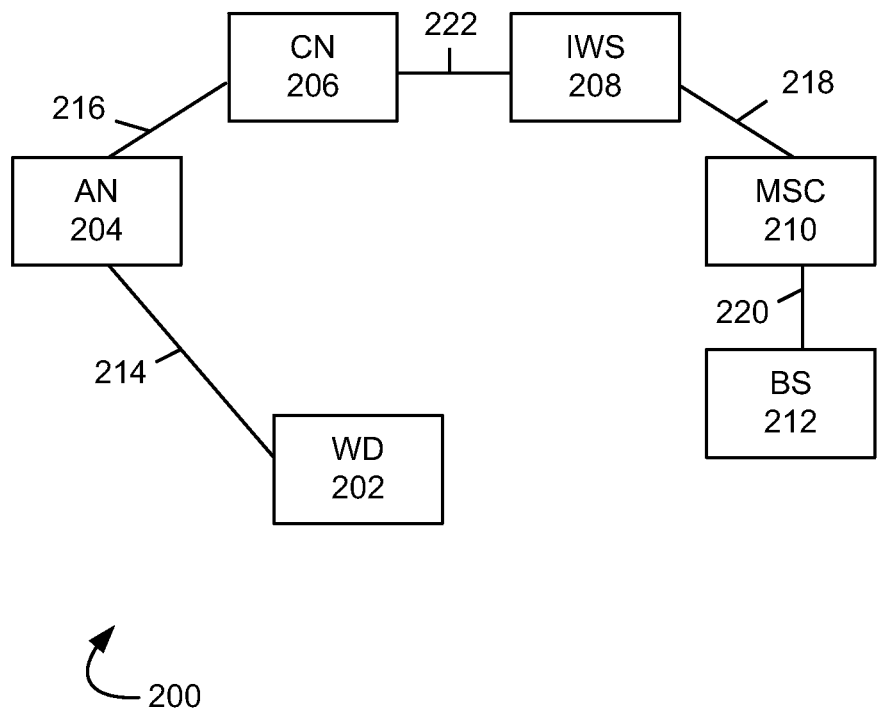
FIG. 2 illustrates another exemplary system to determine a carrier for a wireless device.

FIG. 2 illustrates an exemplary communication system 200 for determining a carrier for a wireless device. System 200 comprises wireless device 202, access node 204, controlling node 206, interworking solution (IWS) node 208, mobile switching center (MSC) node 210, base station 212, communication links 214, 216, 218, 220, and 222. Wireless device 202 may comprise a device similar to wireless device 102. Access node 204 may comprise and access node similar to access nodes 104 and 106.

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 204 may establish communication with wireless device 202 such that access node 204 provides the wireless device access to a communication network (e.g., communication network 110). Controller node 206 can be any network node configured to manage services within system 200. Controller node 206 may provide other control and management functions for system 200. The controller node 206 can be a single device having various functions or a plurality of devices having differing functions. For example, controller node 206 can include at least one a mobility management entity (MME), a radio network controller (RNC), and a combination thereof.

IWS node 208 may comprise a network node that communicatively connects controller node 206 to MSC node 210. The IWS node 208 can be a single device having various functions or a plurality of devices having differing functions. In an embodiment, IWS node 208 may comprise an SG interface that communicatively connects controller node 206 to MSC node 210. MSC node 210 may comprise a mobile switching center or a mobile switching center server (MSC-S) that implements a circuit switched mobile telephony system. In an embodiment, MSC node 210 may route voice serves for wireless devices that implement a circuit switched radio access technology (e.g., CDMA, GSM, and the like). Base station 212 may comprise a wireless access point that implements a circuit switched radio access technology (RAT) and provides access to a communication network (e.g., communication network 108). For example, base station 212 may provide wireless services (e.g., voice services) to wireless device 202.

Communication links 214, 216, 218, 220, and 222, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

System 200 may implement a circuit switched fallback (CSFB) or an enhanced circuit switched fallback (eCSFB). For example, access node 204 may communicate with wireless devices using a packet switched RAT (e.g., LTE and the like) while based station 212 may communicate with wireless devices using a circuit switched RAT (e.g., CDMA, GSM, and the like). In an embodiment, the packet switched RAT may provide robust data services for wireless devices, however voice services may be provided using the circuit switched RAT (e.g., using base station 212 as an access point). When wireless device 202 is communicating with access node 204 using a packet switched RAT (e.g., LTE), a circuit switch fallback protocol may be used to provide voice services to the wireless device using the circuit switched RAT (e.g., CDMA, GSM, and the like). Accordingly, a CSFB or eCSFB protocol may be used to provide voice services to wireless device 202, where wireless devices 202 switches from communicating using a packet switched RAT to communicating using a circuit switched RAT.

In an embodiment, a CSFB implementation may commence when a page is sent to IWS node 208. IWS node 208 may then send a page to access node 204 and wireless device 202 via controller node 206 using an S102 interface (e.g., CDMA interface for LTE). Wireless device 202 may then switch to communicating with a circuit switched RAT (e.g., CDMA 1x) and send a page response to base station 212. A voice call may then proceed at wireless device 202 using base station 212 as an access point to the wireless communication network. Other embodiments may include any other suitable CSFB implementation.

In an embodiment, an eCSFB implementation may commence when a page is sent to IWS node 208. IWS node 208 may then send a page to access node 204 and wireless device 202 via controller node 206 using the S102 interface (e.g., CDMA interface for LTE). Wireless device 202 may then send a page response to IWS node 208 via access node 204 and controlling node 206 using the S102 interface. IWS node 208 may then send a handoff message to wireless device 202 (e.g., using the S102 interface) and IWS node 208 may also set up traffic channels on the circuit switched network (e.g., CDMA 1x). Wireless device 202 may then be handed off from access node 204 to base station 212 and wireless device 202 may switch to using a circuit switched RAT to communicate with base station 212 (e.g., CDMA 1x). A voice call may then proceed at wireless device 202 using base station 212 as an access point to the wireless communication network. Other embodiments may include any other suitable eCSFB implementation.

In an embodiment, a network may comprise a mix of access nodes, where a first type of access node may implement at least one of CSFB or eCSFB, and a second type of access node may not implement a circuit switch fallback protocol. Accordingly, a system that considers the circuit switch fallback functionality for an access point (e.g., access node) that is providing service to a wireless device may provide enhanced voice and data services.

Systems and methods are described for determining a carrier for a wireless device. Data may be communicated between a wireless device and a wireless communication network over a first carrier. It may be determined whether the wireless communication network provides a fallback protocol for switching the wireless device from the first carrier to a second carrier. The wireless device may be instructed to communicate with the wireless communication network over the second carrier when it is determined that the wireless communication network does not provide the fallback protocol.

Figure 3:
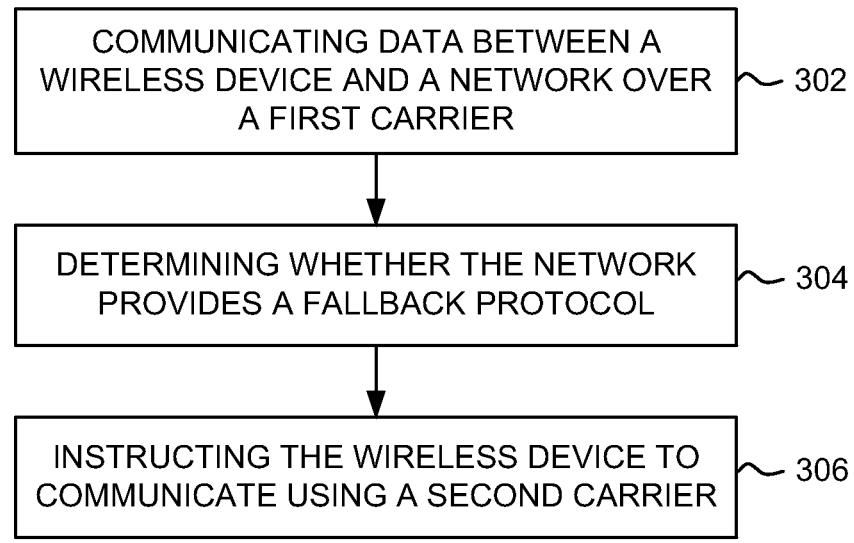
FIG. 3 illustrates an exemplary method of determining a carrier for a wireless device.

FIG. 3 illustrates an exemplary method for determining a carrier for a wireless device. The method will be discussed with reference to the exemplary communication system 200 illustrated in FIG. 2, however, the method can be implemented with any suitable communication system.

Referring to FIG. 3, at step 302, data may be communicated between a wireless device and a wireless communication network over a first carrier. For example, data may be communicated between wireless device 202 and access node 204 over a first carrier. The first carrier may comprise a frequency band or a band class. Wireless device 202 and access node 204 may communicate over the first carrier using a packet switched RAT (e.g., LTE).

At step 304, it may be determined whether the wireless communication network provides a circuit switch fallback protocol. When communicating with the wireless communication network over a second carrier, wireless device 202 may communicate using a circuit switched RAT (e.g., CDMA, GSM, or the like). In an example, it may be determined whether access node 204 provides a circuit switch fallback protocol for switching wireless device 202 from the first carrier (e.g., communicating using LTE) to a second carrier (e.g., communicating using CDMA, GSM, or the like). The second carrier may comprise a frequency band or a band class.

At step 306, the wireless device may be instructed to communicate with the wireless communication network over the second carrier when it is determined that the wireless communication network does not provide the fallback protocol. For example, wireless device 202 may be instructed to communicate over the second carrier when it is determined that access node 204 does not provide a circuit switch fallback protocol.

In an embodiment, when switching from communicating over the first carrier to communicating over the second carrier, wireless device 202 may switch from communicating with access node 204 to communicating with base station 212. In another example, when switching from communicating over the first carrier to communicating over the second carrier, access node 204 may handover wireless device 202 to base station 212. In an embodiment, an access point may implement both a packet switched RAT and a circuit switched RAT, and accordingly an inter-RAT handover may be performed at the single access point (e.g., without performing an inter-access point handover).

Figure 4:
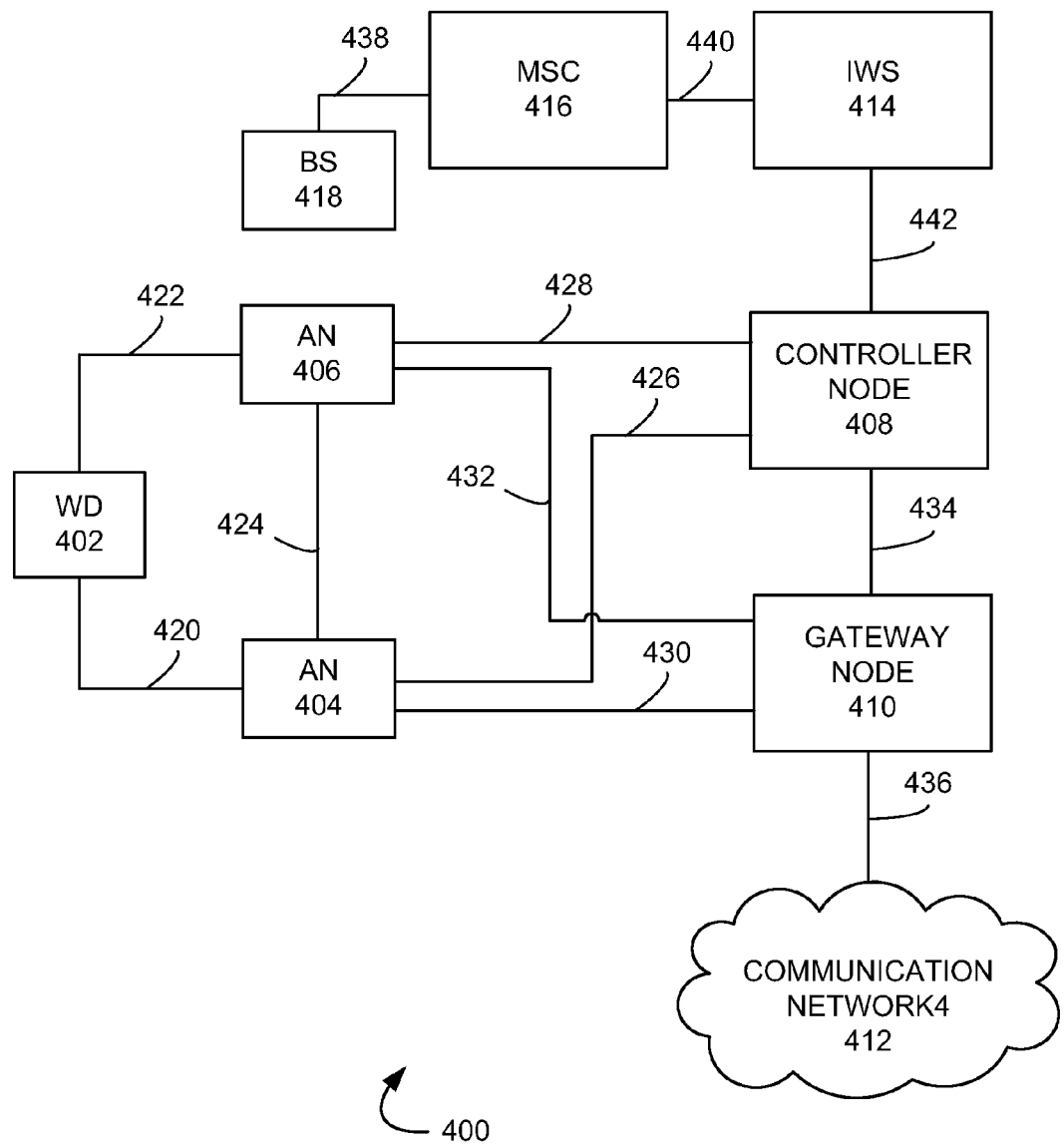
FIG. 4 illustrates another exemplary system to determine a carrier for a wireless device.

FIG. 4 illustrates another exemplary communication system 400 determine a carrier for a wireless device. Communication system 400 may comprise wireless device 402, access node 404 and 406, controller node 408, gateway node 410, communication network 412, interworking solution (IWS) node 414, mobile switching center (MSC) node 416, base station 418, communication links 420, 422, 424, 426, 428, 430, 432, 434, 436, 438, 440, and 442. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, or an eNodeB device. In an embodiment, access node 404 can comprise a serving access node for wireless device 402. Access nodes 404 and 406 may communicate with controller node 408 over communication links 426 and 428, respectively, and with gateway node 410 over communication links 430 and 432, respectively. Access nodes 404 and 406 may also communicate directly with each other over communication link 424.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

IWS node 414 may comprise a network node that communicatively connects controller node 408 to MSC node 416. The IWS node 414 can be a single device having various functions or a plurality of devices having differing functions. In an embodiment, IWS node 414 may comprise an SG interface that communicatively connects controller node 408 to MSC 416. MSC node 416 may comprise a mobile switching center or a mobile switching center server (MSC-S) that implements a circuit switched mobile telephony system. In an embodiment, MSC node 416 may route voice serves for wireless devices that implement a circuit switched radio access technology (e.g., CDMA, GSM, and the like). Base station 418 may comprise a wireless access point that implements a circuit switched radio access technology (RAT) and provides access to a communication network (e.g., communication network 412). For example, base station 418 may provide wireless services (e.g., voice services) to wireless device 402.

Communication links 418, 420, 422, 424, 426, 428, 430, 432, 434, 436, 438, 440, and 442 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access nodes 404 and/or 406 may perform all or parts of the methods of FIGS. 3 and 6.

In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 404 may establish communication with wireless device 402 such that access node 404 provides the wireless device access to a communication network (e.g., communication network 412). System 400 may implement a circuit switched fallback (CSFB) or an enhanced circuit switched fallback (eCSFB). For example, access node 404 may communicate with wireless devices using a packet switched RAT (e.g., LTE and the like) while based station 418 may communicate with wireless devices using a circuit switched RAT (e.g., CDMA, GSM, and the like). In an embodiment, the packet switched RAT may provide robust data services for wireless devices, however voice services may be provided using the circuit switched RAT (e.g., using base station 418 as an access point). When wireless device 402 is communicating with access node 404 using a packet switched RAT (e.g., LTE), a circuit switch fallback protocol may be used to provide voice services to the wireless device using the circuit switched RAT (e.g., CDMA, GSM, and the like). Accordingly, a CSFB or eCSFB protocol may be used to provide voice services to wireless device 402, where wireless devices 402 switches from communicating using the packet switched RAT to communicating using the circuit switched RAT.

In an embodiment, a CSFB implementation may commence when a page is sent to IWS node 414. IWS node 414 may then send a page to access node 406 and wireless device 402 via controller node 408 using an S102 interface (e.g., CDMA interface for LTE). Wireless device 402 may then switch to communicating with a circuit switched RAT (e.g., CDMA 1x) and send a page response to base station 418. A voice call may then proceed at wireless device 402 using base station 418 as an access point to the communication network 412. Other embodiments may include any other suitable CSFB implementation.

In an embodiment, an eCSFB implementation may commence when a page is sent to IWS node 414. IWS node 414 may then send a page to access node 404 and wireless device 402 via controller node 408 using the S102 interface (e.g., CDMA interface for LTE). Wireless device 402 may then send a page response to IWS node 414 via access node 404 and controlling node 408 using the S102 interface. IWS node 414 may then send a handoff message to wireless device 402 (e.g., using the S102 interface) and IWS node 414 may also set up traffic channels on the circuit switched network (e.g., CDMA 1x). Wireless device 402 may then be handed off from access node 404 to base station 418 and wireless device 402 may switch to using a circuit switched RAT to communicate with base station 418 (e.g., CDMA 1x). A voice call may then proceed at wireless device 402 using base station 418 as an access point to communication network 412. Other embodiments may include any other suitable eCSFB implementation.

Figure 5A:
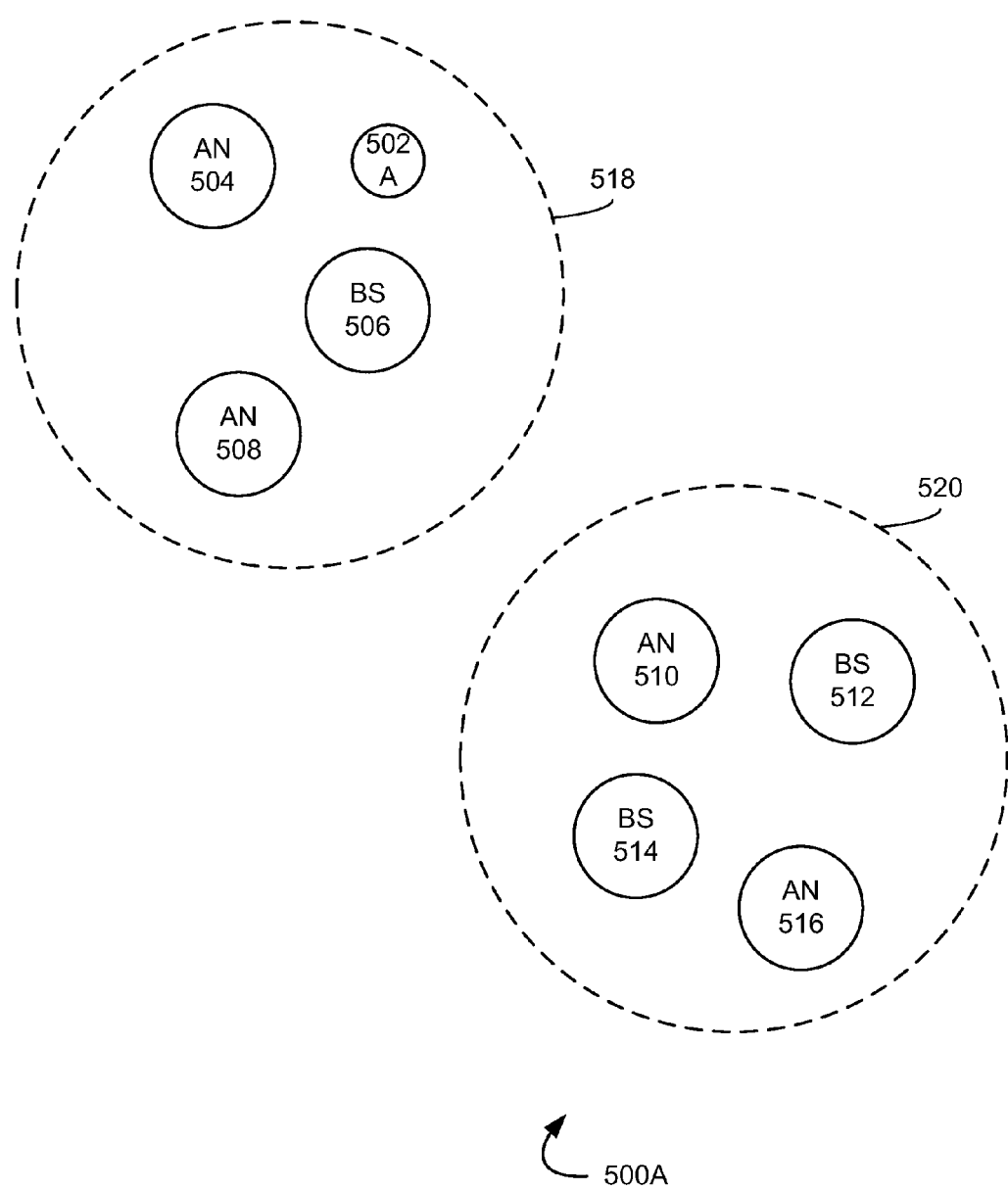
FIGS. 5A and 5B illustrate exemplary systems to determine a carrier for a wireless device.
Figure 5B:
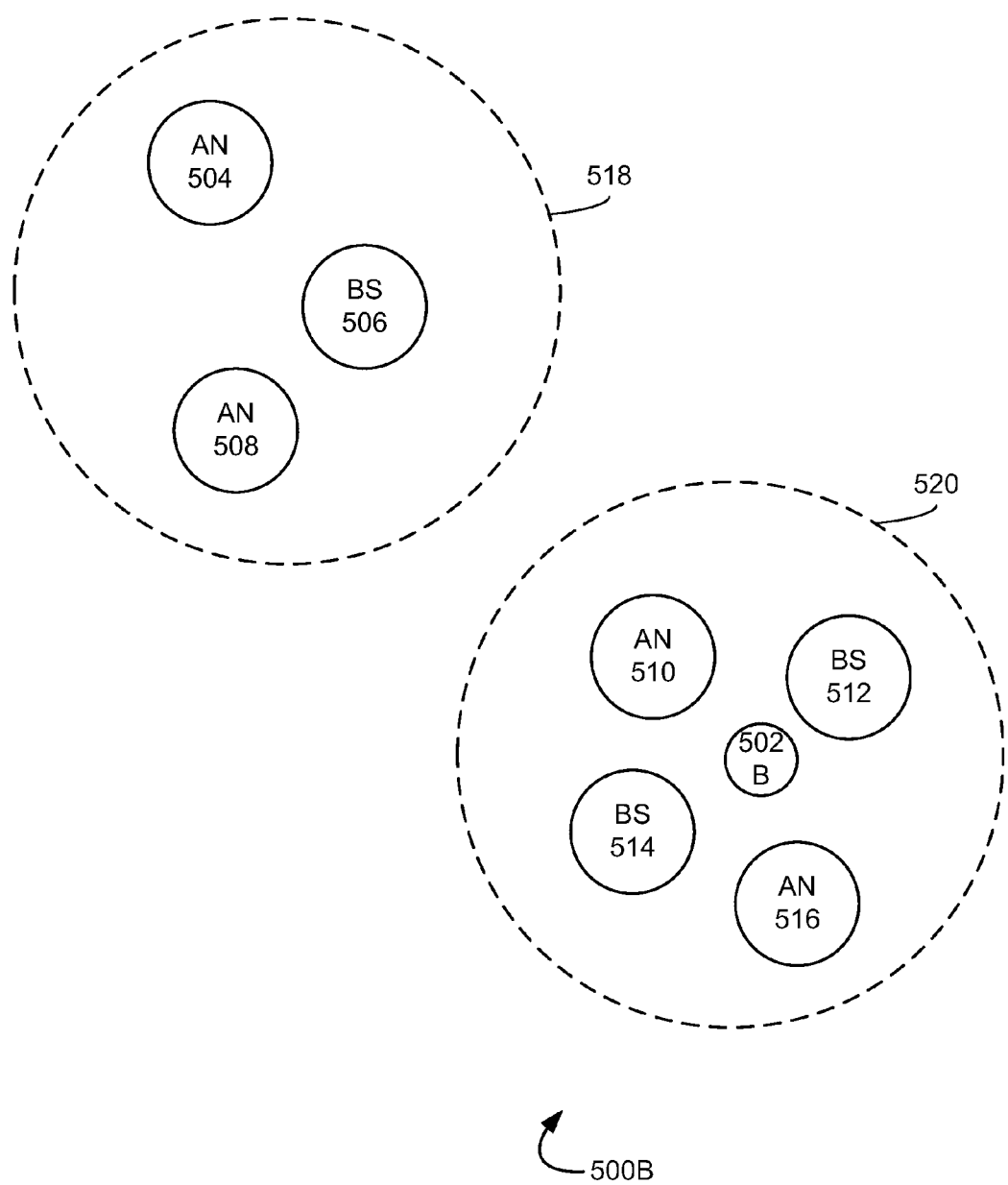

FIGS. 5A and 5B illustrate exemplary communication systems 500A and 500B for determining a carrier for a wireless device. Systems 500A and 500B comprise wireless device 502A and 502B, access nodes 504, 508, 510, and 516, and base stations 506, 512, and 514, and geographic areas 518 and 520. Wireless device 502A and 502B may comprise a single wireless device located at the position depicted in FIG. 5A at a first time and at the location depicted in FIG. 5B at a second time. Wireless device 502A and 502B may also comprise a device similar to wireless device 402. Access nodes 504, 508, 510, and 516 may comprise access nodes similar to access nodes 404 and 406. Base stations 506, 512, and 514 may comprise base stations similar to base station 418. Geographic areas 518 and 510 may comprise geographic areas defined by geographic boundaries (e.g., longitude and latitude) or access points (e.g., access nodes and base station) within the geographic areas.

In an embodiment, a network may comprise a mix of access nodes, where a first type of access node may implement at least one of CSFB or eCSFB, and a second type of access node may not implement a circuit switch fallback protocol. In an embodiment, the first type of access node may be associated with a first vendor and/or manufacturer and the second type of access node may be associated with a second vendor and/or manufacturer. In another embodiment, access nodes 504 and 508 located in geographic region 518 may not implement a circuit switch fallback protocol and access nodes 510 and 516 located in geographic region 520 may implement at least one of CSFB or eCSFB. Accordingly, a system that considers the circuit switch fallback functionality for an access point (e.g., access node) that is providing service to a wireless device may provide enhanced voice and data services.

Systems and methods are described for determining a carrier for a wireless device. Data may be communicated between a wireless device and a wireless communication network over a first carrier. It may be determined whether the wireless communication network provides a fallback protocol for switching the wireless device from the first carrier to a second carrier. The wireless device may be instructed to communicate with the wireless communication network over the second carrier when it is determined that the wireless communication network does not provide the fallback protocol.

Figure 6:
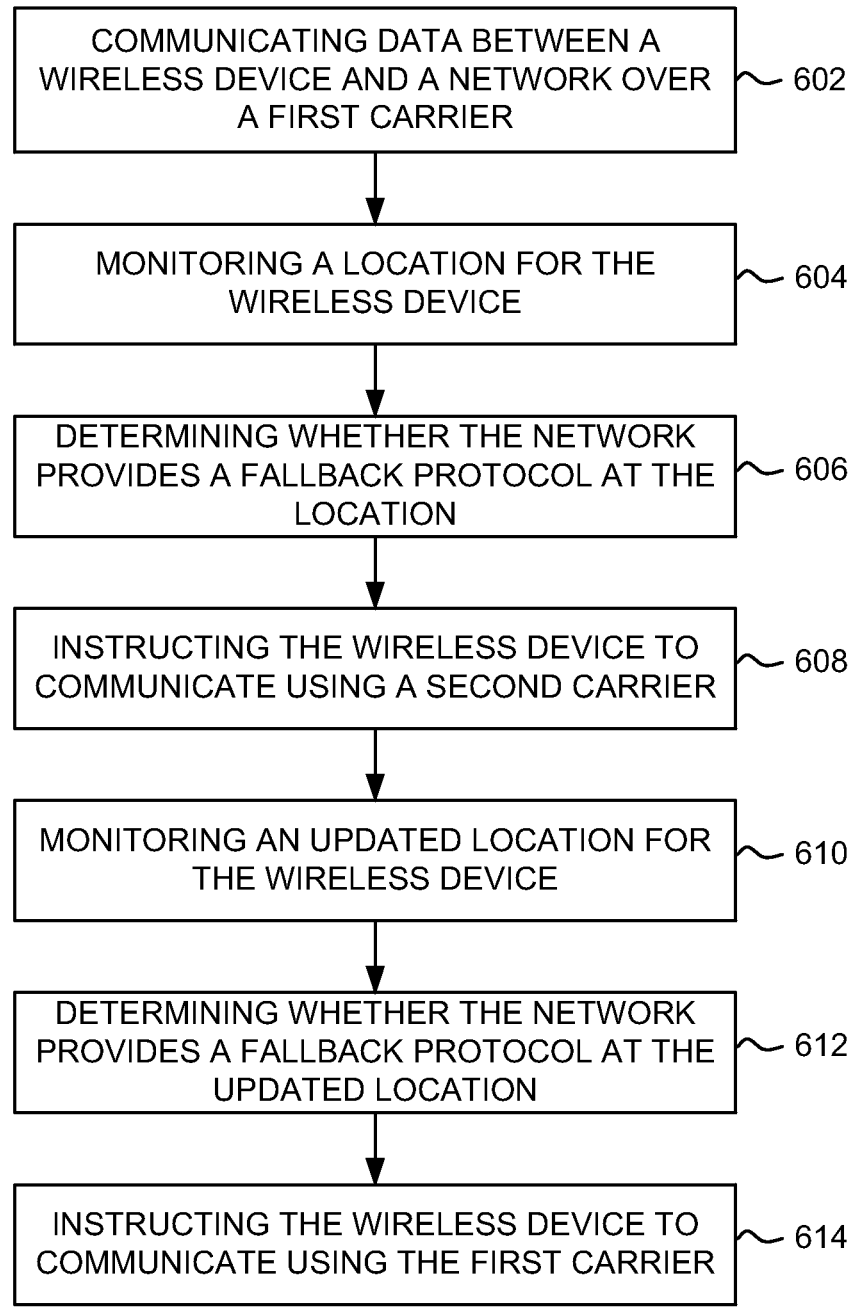
FIG. 6 illustrates another exemplary method of determining a carrier for a wireless device.

FIG. 6 illustrates an exemplary method for scheduling wireless resources with coordinated multipoint transmissions. The method will be discussed with reference to the exemplary communication system 500 illustrated in FIG. 5, however, the method can be implemented with any suitable communication system.

Referring to FIG. 6, at step 602, data may be communicated between a wireless device and a wireless communication network over a first carrier. For example, data may be communicated between wireless device 502A and access node 504 over a first carrier. Wireless device 502A and access node 504 may communicate over the first carrier using a packet switched RAT (e.g., LTE).

In an embodiment, the first carrier may be associated with a packet switched RAT (e.g., LTE) and a second carrier may be associated with a circuit switched RAT (e.g., CDMA, GSM, and the like). The first carrier and the second carrier may each comprise a frequency band or band class.

At step 604, a location may be monitored for the wireless device. For example, a location may be monitored for wireless device 502A traveling through system 500A. The location may be monitored based on a received channel quality indicator (CQI) from wireless device 502A, a global positioning system (GPS), a determined mobility, signal triangulation (e.g., using signal levels detected at the wireless device from multiple access nodes), and the like.

In an embodiment, wireless device 502A may communicate with a GPS system, and the GPS system may be used to monitor the location of the wireless device. In another embodiment, a CQI for wireless device 502A may indicate a distance from access node 504. Accordingly, based on the CQI and other data (e.g., a sector for the serving access node, historic data about CQI measurements and associated determined locations, and the like) a location may be monitored for wireless device 502A. In another embodiment, signal triangulation may be used to monitor the location. For example, wireless device 502A may receive signals (e.g., reference signals) from a plurality of access points (e.g. access nodes 504 and 508 and base station 506) at different signal levels. Based on the received signal levels, a distance from each access point may be determined. Accordingly, using the determined distances, a location may be monitored for the wireless device. In an embodiment, a sounding reference signal may be transmitted from access node 504, and a location for wireless device 502A may be determined based on the sounding reference signal.

At step 606, it may be determined whether the wireless communication network provides a circuit switch fallback protocol. In an example, it may be determined whether access node 504 provides a circuit switch fallback protocol for switching wireless device 502A from the first carrier (e.g., communicating using LTE) to a second carrier (e.g., communicating using CDMA, GSM, or the like).

In an embodiment, determining whether the wireless communication network provides a circuit switch fallback protocol may be based on the monitored location for wireless device 502A. For example, it may be determined that the monitored location for wireless device 502A is proximate to access nodes 504 and 508. Accordingly, determining whether the wireless communication network provides a circuit switch fallback protocol may be based on whether access nodes 504 and 508 provide the circuit switch fallback protocol.

In an embodiment, one or more geographic regions (e.g., geographic regions 518 and 520) may be determined such that the each geographic region is associated with a circuit switch fallback functionality. For example, geographic region 518 may comprise access nodes 504 and 508, and access nodes 504 and 508 may not implement a circuit switch fallback protocol. Accordingly, geographic region 518 may be associated with a lack of circuit switch fallback functionality. In another example, geographic region 520 may comprise access nodes 510 and 516, and access nodes 510 and 516 may implement at least one of CSFB or eCSFB. It may be determined that the wireless communication network does not provide a circuit switch fallback based on the geographic region for wireless device 502A. Here, because wireless device 502A is located in geographic region 518, it may be determined that the wireless communication network does not provide a circuit switch fallback protocol. The geographic region information, such as geographic boundaries for the regions and associated circuit switch fallback functionality, may be stored in a database. The database may be accessed to determine whether the wireless communication network provides a circuit switch fallback protocol based on wireless device location.

In an embodiment, it may be determined whether the wireless communication network provides a circuit switch fallback based on a test call from wireless device 502A. For example, wireless device 502A may be instructed to perform a test call that would initiate a circuit switch fall back protocol if one were implemented by the serving access node. In this example, serving access node 504 does not implement a circuit switch fallback protocol and therefore the test call fails to initiate the circuit switch fallback protocol. Based on the failed attempt, it may be determined that the wireless communication network does not provide circuit switch fallback protocol.

In an embodiment, it may be determined whether the wireless communication network provides a circuit switch fallback based on a location (e.g., longitude and latitude) for the wireless device. For example, the circuit switch fallback functionality of communication network 500A at particular geographic locations (e.g., longitude and latitude) may be stored in a database. The database may be accessed to determine whether the wireless communication network provides a circuit switch fallback protocol based on wireless device location.

In an embodiment, the determining whether the wireless communication network provides a circuit switch fallback protocol may be performed at a first time. For example, the first time may include a handover of wireless device 502A. In another example, the first time may include the monitored location for wireless device 502A indicating a change in geographic region. The first time may be based on a timer that comprises a predefined period (e.g., 5 minutes, 15 minutes, 30 minutes, an hour, and the like).

At step 608, the wireless device may be instructed to communicate with the wireless communication network over the second carrier when it is determined that the wireless communication network does not provide the fallback protocol. For example, wireless device 502A may be instructed to communicate over the second carrier when it is determined that access nodes 504 and 508 does not provide a circuit switch fallback protocol.

In this example, when switching from communicating over the first carrier to communicating over the second carrier, wireless device 502A may switch from communicating with access node 504 to communicating with base station 506. In another example, when switching from communicating over the first carrier to communicating over the second carrier, access node 504 may handover wireless device 502A to base station 506. In an embodiment, an access point may implement both a packet switched RAT and a circuit switched RAT, and accordingly an inter-RAT handover may be performed at the single access point (e.g., without performing an inter-access point handover).

At step 610, an updated location may be monitored for the wireless device. For example, an updated location may be monitored for wireless device 502B traveling through system 500B. In this example, wireless device 502B may comprise an updated location from the location for wireless device 502A. For example, wireless device 502B may communicate with base station 512 over the second carrier using a circuit switched RAT (e.g., CDMA, GSM, and the like). In an embodiment, wireless device 502B communicates over the second carrier based on instructions from step 608.

The updated location may be monitored based on a received channel quality indicator (CQI) from wireless device 502B, a global positioning system (GPS), a determined mobility, signal triangulation (e.g., using signal levels detected at the wireless device from multiple access nodes), and the like. In an embodiment, wireless device 502B may communicate with a GPS system, and the GPS system may be used to monitor the updated location of the wireless device. In another embodiment, a CQI for wireless device 502B may indicate a distance from base station 512. Accordingly, based on the CQI and other data (e.g., a sector for the serving access node, historic data about CQI measurements and associated determined locations, and the like) an updated location may be monitored for wireless device 502B. In another embodiment, signal triangulation may be used to monitor the updated location. For example, wireless device 502B may receive signals (e.g., reference signals) from a plurality of access points (e.g. access nodes 510 and 516, and base stations 512 and 514) at different signal levels. Based on the received signal levels, a distance from each access point may be determined. Accordingly, using the determined distances, an updated location may be monitored for the wireless device.

At step 612, it may be determined whether the wireless communication network provides a circuit switch fallback protocol. In an example, it may be determined whether access node 510 provides a circuit switch fallback protocol for switching wireless device 502B from the first carrier (e.g., communicating using LTE) to a second carrier (e.g., communicating using CDMA, GSM, or the like).

In an embodiment, determining whether the wireless communication network provides a circuit switch fallback protocol may be based on the updated location for wireless device 502B. For example, it may be determined that the updated location for wireless device 502B is proximate to access nodes 510 and 516. Accordingly, determining whether the wireless communication network provides a circuit switch fallback protocol may be based on whether access nodes 510 and 516 provide the circuit switch fallback protocol.

In an embodiment, one or more geographic regions (e.g., geographic regions 518 and 520) may be determined such that the each geographic region is associated with a circuit switch fallback functionality. For example, geographic region 518 may be associated with a lack of circuit switch fallback functionality. In another example, geographic region 520 may comprise access nodes 510 and 516, and access nodes 510 and 516 may implement at least one of CSFB or eCSFB. Accordingly, geographic region 520 may be associated with providing a circuit switch fallback functionality. It may be determined that the wireless communication network provides a circuit switch fallback based on the geographic region for wireless device 502B. Here, because wireless device 502B is located in geographic region 520, it may be determined that the wireless communication network provides a circuit switch fallback protocol. The geographic region information, such as geographic boundaries for the regions and associated circuit switch fallback functionality, may be stored in a database. The database may be accessed to determine whether the wireless communication network provides a circuit switch fallback protocol based on wireless device location.

In an embodiment, it may be determined whether the wireless communication network provides a circuit switch fallback based on a location (e.g., longitude and latitude) for the wireless device. For example, the circuit switch fallback functionality of communication network 500B at particular geographic locations (e.g., longitude and latitude) may be stored in a database. The database may be accessed to determine whether the wireless communication network provides a circuit switch fallback protocol based on wireless device location.

In an embodiment, the determining whether the wireless communication network provides a circuit switch fallback protocol may be performed at a second time, after wireless device 502A may be instructed to communicate using the second carrier. For example, the second time may include a handover of wireless device 502B from a first access node to a second access node or a first access point to a second access point. The second time may include the updated location for wireless device 502B indicating a change in geographic region. The second time may be based on a timer that comprises a predefined period (e.g., 5 minutes, 15 minutes, 30 minutes, an hour, and the like).

At step 614, the wireless device may be instructed to communicate with the wireless communication network over the first carrier when it is determined that the wireless communication network provides the fallback protocol. For example, wireless device 502B may be instructed to communicate over the first carrier when it is determined that access node 510 provides a circuit switch fallback protocol.

In this example, when switching from communicating over the second carrier to communicating over the first carrier, wireless device 502B may switch from communicating with base station 512 to communicating with access node 510. In another example, when switching from communicating over the second carrier to communicating over the first carrier, base station 512 may handover wireless device 502B to access node 510. In an embodiment, an access point may implement both a packet switched RAT and a circuit switched RAT, and accordingly an inter-RAT handover may be performed at the single access point (e.g., without performing an inter-access point handover).

In an embodiment, wireless device 502B may be instructed to communicate over the first carrier when it is determined that access node 510 provides a circuit switch fallback protocol based on a priority for the first carrier and the second carrier. For example, the first carrier may comprise a higher priority than the second carrier. In some examples, the first carrier may provide a higher priority than the second carrier when wireless device 502B comprises an application requirement that meets an application requirement criteria (e.g., a QCI that includes a data rate above a threshold, error rate below a threshold, and the like) or when wireless device 502B is associated with an application (e.g., running an application) that meets an application criteria (e.g., an application associated with a threshold data rate, such as a streaming video application). Here, wireless device 502B may be instructed to communicate over the first carrier based on both the determination that access node 510 provides a circuit switch fallback protocol and based on the carrier priority for the first carrier and the second carrier.

In an embodiment, steps 606 and 608 (or steps 612 and 614) may be triggered by one or more events. For example, determination step 606 (or 612) may be triggered when a wireless device is handed over to a new access point (e.g., access node or base station). In an embodiment, when the monitored location for a wireless device indicates the wireless device is switching geographic regions, for instance based on geographic boundaries for the geographic regions, determination step 606 (or 612) may be performed. Based on determination step 606 (or 612) the wireless device may be instructed to communicate using one of the first carrier or the second carrier (e.g., at step 608 or 614).

In an embodiment, an access node and a base station may comprise similar wireless network communication access points. For example, an access node may use a packet switched RAT (e.g. LTE and the like) to communicate with wireless devices while a base station may use a circuit switched RAT (e.g., CDMA, GSM, and the like) to communicate with a wireless device. Accordingly, in certain embodiments, an access node and a base station may communicate with wireless devices using different RATs. In an example, an access node or base station may communicate with wireless devices using both a packet switched RAT and a circuit switched RAT. Accordingly, in some embodiments, a wireless device may communicate with the access node or base station over either the first carrier or the second carrier. In these embodiments, where the wireless device is instructed to switch from communicating with a first RAT to communicating with a second RAT (or switch from communicating over a first carrier to communicating over a second carrier) an inter-RAT handover may be performed rather than an inter-access point handover.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
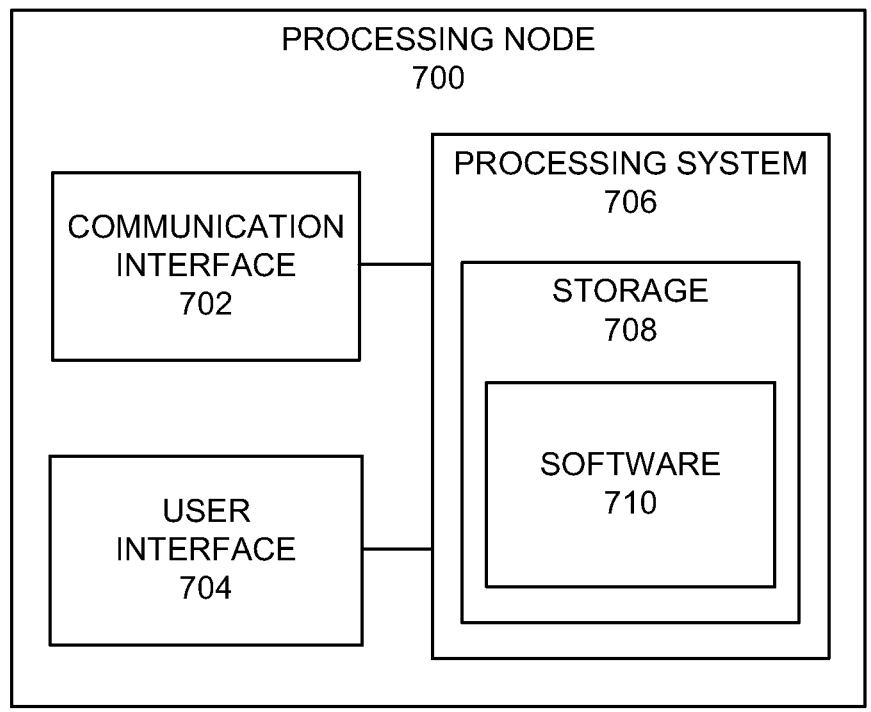
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 104 or 404 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a carrier for a wireless device, the method comprising:
communicating data between a wireless device and an access node of a communication network over a first carrier using a first radio access technology;
determining, at a first time after expiration of a timer, whether the communication network provides a circuit switch fallback protocol for switching the wireless device from the first carrier to a second carrier;
instructing the wireless device to communicate with the access node over the second carrier using a second radio access technology when it is determined, at the first time after expiration of the timer, that the communication network does not provide the circuit switch fallback protocol, wherein the first radio access technology differs from the second radio access technology;
determining, at a second time after expiration of the timer, that the communication network provides the circuit switch fallback protocol for switching the wireless device from the first carrier to the second carrier; and
instructing the wireless device to communicate with the communication network over the first carrier when it is determined, at the second time after expiration of the timer, that the communication network does not provide the circuit switch fallback protocol.

2. The method of claim 1, wherein
the communication network provides voice services for the wireless device over the second carrier and does not provide voice services for the wireless device over the first carrier, and
the communication network communicates with the wireless device using the first radio access technology when communicating over the first carrier and the second radio access technology when communicating over the second carrier.

3. The method of claim 1, further comprising monitoring a location for the wireless device, wherein determining, at the first time, whether the communication network provides the circuit switch fallback protocol for switching the wireless device from the first carrier to the second carrier is based on the monitored location after expiration of the timer.

4. The method of claim 3, further comprising:
monitoring an updated location for the wireless device;
determining, based on the updated location at the second time, that the communication network provides the circuit switch fallback protocol for switching the wireless device from the first carrier to the second carrier; and
instructing the wireless device to communicate with the communication network over the first carrier.

5. The method of claim 1, wherein determining, at the first time after expiration of the timer, whether the communication network provides the circuit switch fallback protocol for switching the wireless device from the first carrier to the second carrier further comprises:
determining a location for the wireless device; and
accessing a database that stores circuit switch fallback protocol functionality for the communication network based on location.

6. The method of claim 1, wherein determining, at the first time after expiration of the timer, whether the communication network provides the circuit switch fallback protocol for switching the wireless device from the first carrier to the second carrier further comprises:
instructing, at the first time after expiration of the timer, the wireless device to perform a test voice call using the communication network; and
determining whether the communication network performs the circuit switch fallback protocol when executing the test voice call for the wireless device.

7. The method of claim 6, further comprising: instructing the wireless device to communicate with the access node over the second carrier using the second radio access technology at the first time when the test call, performed by the wireless device at the first time after expiration of the timer, fails to initiate the circuit switch fallback protocol.

8. The method of claim 1, wherein the circuit switch fallback protocol comprise a CSFB or eCSFB protocol, and the circuit switch fallback protocol is used to switch the wireless device from the first carrier to the second carrier in order to provide the wireless device voice services from the communication network.

9. The method of claim 1, wherein the timer comprises at least a predefined plurality of minutes between the second time and the first time.

10. The method of claim 1, further comprising:
retrieving one or more application requirements for the communication between the wireless device and the access node; and
instructing the wireless device to communicate with the communication network over the first carrier at the second time when the retrieved one or more application requirements meet a criteria.

11. The method of claim 10, wherein instructing the wireless device to communicate with the communication network over the first carrier at the second time comprises performing an inter-RAT and intra-access point handover.

12. A system for determining a carrier for a wireless device, the system comprising:
a processing node with a processor in communication with memory which include instructions that, when executed, configure to processing node to:
communicate data between a wireless device and an access node of a communication network over a first carrier using a first radio access technology;
determine, at a first time after expiration of a timer, whether the communication network provides a circuit switch fallback protocol for switching the wireless device from the first carrier to a second carrier; and
instruct the wireless device to communicate with the access node over the second carrier using a second radio access technology when it is determined, at the first time after expiration of the timer, that the communication network does not provide the circuit switch fallback protocol, wherein the first radio access technology differs from the second radio access technology;
determine, at a second time after expiration of the timer, that the communication network provides the circuit switch fallback protocol for switching the wireless device from the first carrier to the second carrier; and
instruct the wireless device to communicate with the communication network over the first carrier.

13. The system of claim 12, wherein the communication network provides voice services for the wireless device over the second carrier.

14. The system of claim 12, wherein the communication network does not provide voice services for the wireless device over the first carrier.

15. The system of claim 12, where the processing node is further configured to:
monitor a location for the wireless device, wherein determining, at the first time, whether the communication network provides the circuit switch fallback protocol for switching the wireless device from the first carrier to the second carrier is based on the monitored location after expiration of the timer.

16. The system of claim 15, where the processing node is further configured to:
monitor an updated location for the wireless device;
determine, based on the updated location at the second time, that the communication network provides the circuit switch fallback protocol for switching the wireless device from the first carrier to the second carrier; and
instruct the wireless device to communicate with the communication network over the first carrier.

17. The system of claim 12, wherein determining, at the first time after expiration of the timer, whether the communication network provides the circuit switch fallback protocol for switching the wireless device from the first carrier to the second carrier further comprises:
determining a location for the wireless device; and
accessing a database that stores circuit switch fallback protocol functionality for the communication network based on location.

18. The system of claim 12, wherein determining, at the first time after expiration of the timer, whether the communication network provides the circuit switch fallback protocol for switching the wireless device from the first carrier to the second carrier further comprises:
instructing the wireless device to perform a test voice call using the communication network; and
determining whether the communication network performs the circuit switch fallback protocol when executing the test voice call for the wireless device.

19. The system of claim 12, wherein the circuit switch fallback protocol comprises a circuit switch fallback protocol or an enhanced circuit switch fall back protocol.

* * * * *